Patented Nov. 22, 1932

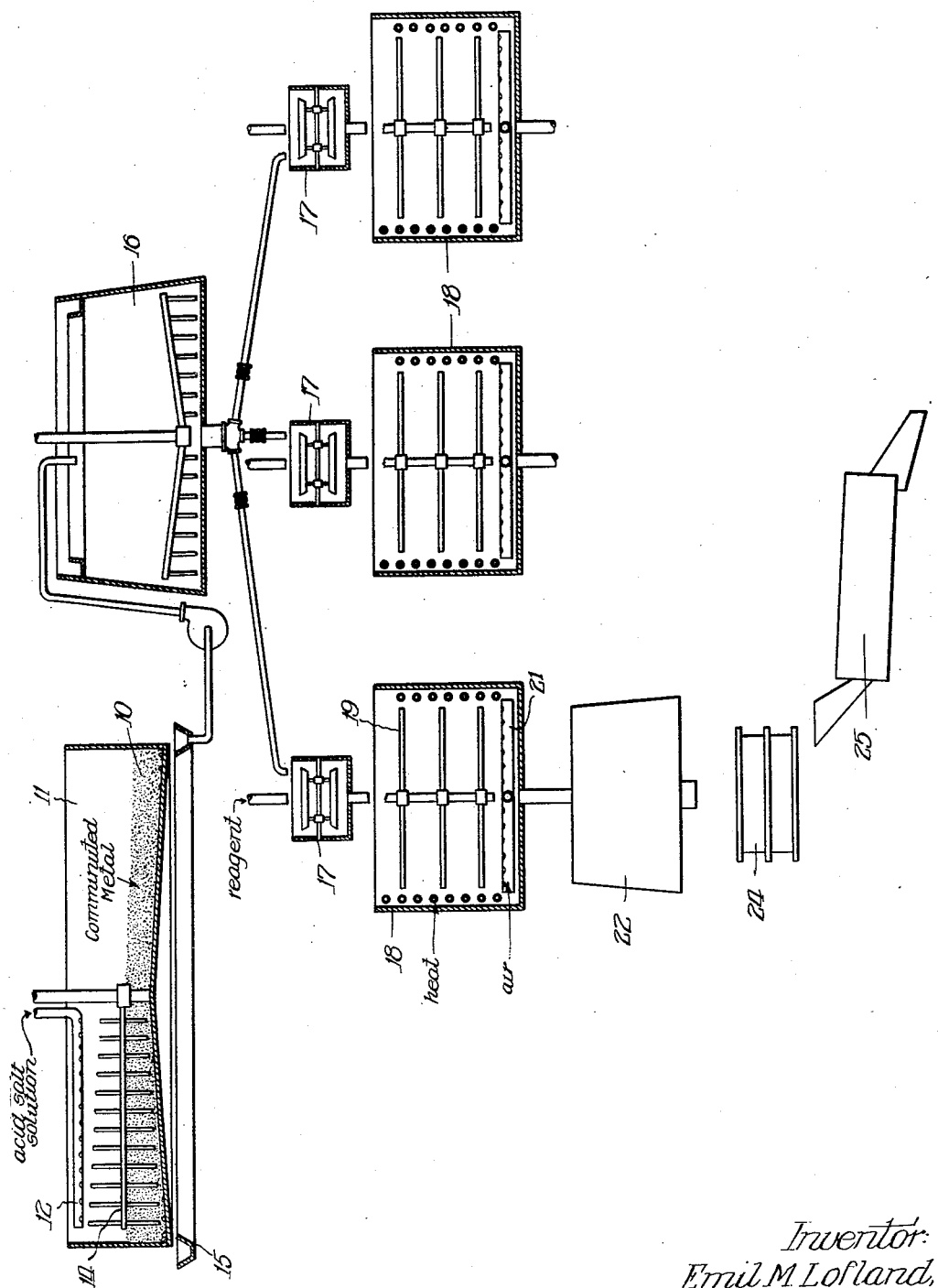

1,888,464

UNITED STATES PATENT OFFICE

EMIL M. LOFLAND, OF CHICAGO, ILLINOIS

MANUFACTURE OF PIGMENTS

Application filed September 27, 1928. Serial No. 308,628.

This invention relates to a process for the manufacture of pigments and pertains particularly to the manufacture of pigments from metals, such as iron.

Certain characteristics are recognized as desirable and advantageous in pigments generally and particularly in pigments used in surface covering materials such as paints and the like. Among these desirable qualities may be mentioned tinctorial power or strength, which quality is of advantage in respect to the quantity or proportion of pigment requisite in a paint or the like to give the desired color value. Another desirable quality is lustre or brilliance, which is advantageous not only in the visual effectiveness of the paint but also in the range of effective shades or variations obtainable by varying the proportion of pigment used. Another desirable quality is covering surface, or the capacity of the pigment for covering or obliterating a different color, as of the surface to which the paint or the like is applied. A highly important quality, of course, is stability or permanence, whereby the pigment is qualified to resist fading or change of color by light, oxidation and other influences to which it is exposed in an applied paint or the like. Other desirable qualities are the capacity of the pigment for forming an intimate admixture with other ingredients of the paint or covering material, and its capacity for bonding with them without excessive absorption of various other ingredients such as oils. In the production of pigments, likewise, the element of cost is of great importance, as is also the capability of accurate control whereby uniformity of results may be obtained in a predetermined manner so that pigments identical in color, shade and other qualities may always be produced by following a certain predetermined procedure and uniform results obtained by predetermined variations of the procedure.

The general object of the present invention is the provision of a process for the production of pigments which will possess the desirable qualities enumerated above and which is susceptible of definite control whereby to obtain the desired uniformity in the product.

Another object is the provision of such a process which is susceptible of definite control in variations of the procedure to obtain desired variance in the tinctorial quality of the product.

A third object is the provision of a method whereby pigments may be produced at low cost and in large quantities.

Another object is the provision of a method for the production of pigments directly from metallic iron.

Other and further objects will be pointed out or indicated hereinafter or will appear to one skilled in the art upon an understanding of the invention or its employment in practice.

Described generally, the invention contemplates first the production of a hydrous ferrous oxide directly from metallic iron by a procedure under definite control such as to obtain the ferrous oxide as an intermediate product of definite character. This production of hydrous ferrous oxide is accomplished by wetting comminuted or fragmentary metallic iron, such as iron borings, with a solution of an acid or an acid salt, exposing the wetted fragments to the action of oxygen, as in air, for a period adequate to permit the conversion of surface portions to hydrous ferrous oxide, and removing the hydrous ferrous oxide from contact with the iron before it is converted to the ferric form. A procedure for thus producing hydrous ferrous oxide is described more in detail in my Patent No. 1,689,951, issued October 30, 1928, on a copending application Serial No. 129,289, filed August 14, 1926. The hydrous ferrous oxide so produced is in pulverulent or flocculent form and is recovered in a sludge, a considerable proportion of which is made up of the wetting solution referred to. The hydrate corresponds to the formula $FeO.xH_2O$ or $Fe(OH)_2,xH_2O$, and is of a bluish-green color and has an unsatisfied base affinity. By control of the strength and kind of the wetting solution and the period of exposure of the wetted iron to the action of oxygen before removal of the hydrous ferrous oxide, the latter may be obtained of a desired uniformity, and by predetermined variations of these factors definite variations in some of its characteristics may be obtained as desired. This hydrous ferrous oxide is quite unstable and tends to pass over to the ferric form quite readily under the action of oxygen, but while it is in the sludge condition the associated liquid forms an effective deterrent to such conversion. In such state the hydrous ferrous oxide is subjected, under controlled conditions, to treatment whereby it is modified and converted to a stable form of oxide. This treatment is effected selectively with three controllable factors, viz: oxidation, heat and an alkaline reagent. By selected variations of these control factors desired variations in the end product may be obtained. To effect oxidation, a suitable quantity of the sludge is subjected to the action of oxygen for a suitable period, as by blowing air through it, under which treatment it gradually changes color from its original bluish-green to yellow, this change in color marking the transition of the oxide from the ferrous to the ferric form. By continuing the treatment with air after the oxide has attained the yellow color characteristic of ferric oxide and while it is in the sludge liquid, gradual changes are brought about in the crystal structure of the oxide, which are ultimately reflected in the color, texture, lustre and other qualities of the end product. As to color, prolongation of the air treatment produces a darkening and deepening of the yellow color, and if carried to a sufficient extent, a change to brown.

The initial oxidizing treatment whereby the oxide is changed from its bluish-green color, characteristic of the ferrous form, to the yellow color, characteristic of the ferric form, may be carried on satisfactorily at ordinary room temperature, and, in fact, the application of too high a temperature at this time will convert the bluish-green compound to a compound having a bluish-black color. Therefore, the temperature during this initial oxidation period should not be permitted to rise much above 60° C. if a yellow product is desired. After the change from the bluish-green color to the yellow color has been accomplished however, higher temperatures may be applied with beneficial results in the crystalline structure and texture of the end product, and with such heating the air treatment may be continued to obtain different desired shades and color variations in yellows and browns. The temperatures employed at this stage may range up to close to boiling.

The color changes apparently are brought about by changes effected in the structure of the oxide and in its water of constitution by the treatment with air and heat in the presence of the sludge liquid. Consequently, a desired color or shade may always be obtained by treatment of a given quantity of sludge of a given kind and concentration with a given quantity of air and a given quantity of heat.

The third control factor, which may be employed if desired, is an alkaline reagent which is employed for the purpose of modifying the structure of the oxide.

Different kinds of alkalies may be employed, with corresponding differences in effect in the color of the end product, and the alkaline reagent may be mixed with the sludge either before or after the oxidizing treatment, but with different results in the respective cases. Preferably the alkaline reagent is mixed with the hydrate sludge before the latter is subjected to the oxidizing treatment above described. Preferably, it is added in a proportion less than that needed to completely neutralize the sludge solution. The treatment with the alkaline reagent has an important effect, not only in influencing the color of the product but also in influencing its texture, brilliance and other qualities. Strong alkalies tend to give dark colors as compared with the color effects obtained with weak alkalies in similar proportion. Caustic soda, magnesium carbonate, lime, calcium carbonate, sodium carbonate, ammonia and other alkaline reagents may be used.

After treatment with air and heat, and with alkali if desired, as above described, to the point where the desired color is obtained, the oxide is separated from the liquid in any appropriate fashion, and dried, in which condition it is suitable for use as a pigment and as such possesses the various advantages hereinbefore referred to. By suitable control of the treatment as to the amount of air and the amount of heat applied, and the kind of alkaline reagent used and the point in the procedure where it is used, pigments ranging from a very light yellow to a dark red brown may be produced from a given kind of sludge. Any of these pigments, furthermore, may be calcined to produce orange and reds. A black iron pigment may be made by alkalizing the hydrous ferrous oxide sludge and bringing about a relationship of ferrous to ferric oxide in proportion of approximately 1:2. Drying under vacuum or heating to boiling during oxidation as well as the proportion of alkali used will effect this change.

The procedure described may be carried on as a continuous operation and the pigments produced in large quantities at low cost. Other than the alkaline reagents, the materials used may be such as are ordinarily regarded as waste, such as iron borings and chips and the spent liquor which has been used as pickle liquor in various steel manufactures and which is ordinarily a solution of iron sulfate or iron chloride.

A particular example of the process will now be described with reference to the accompanying drawing, which is a diagrammatic illustration in the nature of a flow sheet.

A bed 10 of comminuted metal, such as iron borings, is disposed in a reaction basin 11, the form of the material and depth of the bed being such as to allow its being freely permeated with air. This bed is drenched with a solution of iron sulfate in water of a density of say 10° Baumé, so as to wet the surfaces of the iron fragments and leave the wetted surfaces exposed to air in the bed. The wetting of the bed material may be effected by means of a spray pipe 12, arranged to travel over the bed and discharge the solution thereon, and the solution may be cleaned and neutralized waste pickle liquor diluted with water to the density specified. The wetted fragments are left exposed to the air for a definite period, for example, thirty minutes. In such period of exposure, surface portions of the fragments are converted to a hydrous ferrous oxide which is of a bluish-green color. At the end of this period of exposure, the fragments, while still in the bed, are subjected to an energetic stirring in such fashion that they are caused to rub against one another and scour off the hydrous ferrous oxide by attrition, which stirring may be effected by an agitator 14 which travels progressively over the bed and at the same time is rotated to work the bed. Incident to this stirring to detach the ferrous oxide from the fragments, the portion of the bed being stirred is showered with the iron salt solution, as from pipe 12, so that as the particles of ferrous oxide are detached they are flushed away, and are carried by the flow of the flushing solution down the inclined bottom of the reaction basin and discharged into a launder 15. As the agitator and the spray pipe pass on, the recently stirred and now bare and rewetted fragments in the bed are again left exposed to the action of the air for further formation of hydrous ferrous oxide.

The hydrous ferrous oxide as thus formed is of a fine pulverulent flocculent or granular form, and as discharged into the launder 15 is carried in a much greater proportion of the acid salt solution. From this launder the mixture is pumped to a thickener 16, wherein its concentration is increased to approximately a proportion of one pound of the hydrate per gallon of liquid. The solution separated out in the thickener may be returned for re-use in the reaction basin. At the concentration mentioned the mixture as discharged from the thickener 16 is in the consistency of a fluid sludge. A definite amount of this sludge is drawn off from the thickener to a treating device. The illustration shows three treating devices adapted for independent operation, so that different treatments may be carried on simultaneously in the respective units. As shown in the illustration, each of the respective units comprises a mixer 17, treatment tank 18 equipped with an agitator 19, heating coils 20, and air injecting distributor 21, a secondary thickener 22, filter press 24 and drier 25. In the mixer 17 a selected kind and proportion of alkaline reagent, such as magnesium carbonate in proportion of about 20% (it may vary from 10% to 30%) of the dry weight of the hydrate, may be mixed with the sludge. The mixture is then discharged into the treating tank 18 where it is retained while air is blown through it from the injecting distributor 21, the material at the same time being subjected to stirring by the agitator 19. All of the foregoing operations are carried on at room temperature, and the mixture in the treatment tank is maintained at that temperature until, from the action of the air, it is changed to a yellow color. When such change has taken place, a higher temperature may be applied by means of the heating device 20. With such heating, at a temperature of say 80° C., the agitation and injection of air is continued for a period of say 72 hours, and therewith a further change in the material is brought about, the color becoming darker as the treatment is prolonged. When the desired shade is attained the mixture is drawn off to the secondary thickener 22 wherein as much of the remaining solution is taken off as may be feasible. From the thickener 22 the concentrated material is filtered in a filter press 24, and from that it is taken to the drier 25 wherein it is dried at a moderate temperature and from which the end product is discharged as a dry granular or flaky material, in suitable condition for use as a pigment, such as by grinding with a paint base or other material to form a coloring coating. The pigment produced with the particular materials and treatment specified in the foregoing example is of a strong yellow color.

What I claim is:

1. A process for production of pigment which comprises subjecting metallic iron to oxidation to produce hydrous ferrous oxide, removing the ferrous oxide from the presence of the metallic iron, alkalizing the ferrous oxide in a body of liquid, and oxidizing the ferrous oxide to a ferric oxide.

2. A process for production of pigment which comprises subjecting metallic iron to oxidation to produce hydrous ferrous oxide, removing the ferrous oxide from the presence of the metallic iron and recovering it in a sludge, aerating the sludge to oxidize the ferrous oxide to a ferric form, and separating the ferric oxide from the sludge liquid.

3. A process for production of pigment which comprises subjecting metallic iron to oxidation to produce a hydrous ferrous oxide, removing the ferrous oxide from the presence of the metallic iron and retaining it in a sludge containing an iron salt solution, reacting the sludge with oxygen to oxidize the ferrous oxide to a ferric form, and separating the ferric oxide from the sludge liquid.

4. A process for production of pigment which comprises producing a hydrous ferrous oxide directly from metallic iron, forming a sludge of the ferrous oxide and a liquid, treating the sludge with an alkali, reacting the sludge with oxygen to oxidize the ferrous oxide to a ferric form, and recovering the oxide from the sludge liquid.

5. A process for production of pigment which comprises partially oxidizing metallic iron to form a sludge of pulverulent hydrous ferrous oxide, oxidizing the ferrous oxide to a ferric form in the sludge, and separating the sludge liquid from the solid content.

6. A process for production of pigment which comprises forming a sludge mixture of solid hydrous ferrous oxide and a liquid, oxidizing the ferrous oxide to a ferric form, and recovering the solids from the sludge liquid.

7. A process for production of pigment which comprises reacting metallic iron with oxygen and a liquid to form a sludge of hydrous ferrous oxide, treating the sludge with a substance having an alkaline reaction, reacting the sludge with oxygen at ordinary temperature to the point where the ferrous oxide is converted to a ferric form, thereafter heating the sludge and continuing the treatment with oxygen, and finally drying the solid content of the sludge.

8. A process for production of pigment which comprises producing a sludge mixture of pulverulent hydrous ferrous oxide and a liquid, reacting the sludge at ordinary temperature with oxygen to the point where the ferrous oxide is converted to a ferric form, thereafter heating the sludge and continuing the treatment with oxygen, and finally recovering the solids from the sludge.

9. A process for production of pigment which comprises forming a sludge mixture of hydrous ferrous oxide with an iron salt solution, aerating the sludge at ordinary temperature until it becomes yellow in color, thereafter heating the sludge while continuing aeration thereof, and finally recovering the solid content of the sludge.

10. A process for production of pigment which comprises forming a sludge mixture of pulverulent hydrous ferrous oxide with an iron salt solution, aerating the sludge until it becomes yellow in color, thereafter heating the sludge while continuing aeration thereof, and finally recovering the solid content of the sludge.

In testimony whereof I have hereunto subscribed my name.

EMIL M. LOFLAND.